United States Patent
Smith et al.

[15] 3,692,753
[45] Sept. 19, 1972

[54] TERPOLYMERS CONTAINING THIAALKYL ACRYLATES OR THIAALKYLACRYLAMIDES

[72] Inventors: Donald A. Smith; Ernest J. Perry; both of Rochester; Kenneth R. Hollister, Pittsford, all of N.Y.

[73] Assignee: Eastman Kodak Company, Rochester, N.Y.

[22] Filed: Feb. 16, 1970

[21] Appl. No.: 11,839

Related U.S. Application Data

[63] Continuation-in-part of Ser. No. 701,084, Jan. 29, 1968, Pat. No. 3,615,624.

[52] U.S. Cl. .................................. 260/79.7, 96/114
[51] Int. Cl. ......................... C08f 15/40, G03c 1/04
[58] Field of Search ........................ 260/79.7; 96/114

[56] References Cited

UNITED STATES PATENTS

| | | | |
|---|---|---|---|
| 3,207,656 | 9/1965 | Eldred | 162/168 |
| 3,536,677 | 10/1970 | Hollister | 260/79.3 |
| 3,554,987 | 1/1971 | Smith | 260/79.3 |

*Primary Examiner*—James A. Seidleck
*Assistant Examiner*—C. A. Henderson, Jr.
*Attorney*—W. H. J. Kline, B. D. Wiese and Gerald E. Battist

[57] ABSTRACT

This invention relates to interpolymers, and preferably terpolymers, containing a balanced ratio of certain monomers to facilitate easy coagulation and redispersion. Preferably, the interpolymers comprise at least one monomer which is an effective silver halide peptizer in polymerized form. Balanced polymers of this type provide a system wherein silver halide can be precipitated in the presence of the balanced polymer and can be subsequently coagulated and easily redispersed to permit fast and simple washing of the silver halide.

14 Claims, No Drawings

TERPOLYMERS CONTAINING THIAALKYL ACRYLATES OR THIAALKYLACRYLAMIDES

This application is a continuation-in-part of our copending application, U.S. Ser. No. 701,084 filed Jan. 29, 1968 now U.S. Pat. No. 3,615,624 issued Oct. 26, 1971.

This invention relates to a new class of polymers. In one aspect, this invention relates to an improved process for peptizing and dispersing photographic silver salts by use of interpolymers composed of at least three different monomers. In another aspect, this invention relates to a new class of polymers which can be readily dispersed and coagulated in aqueous systems.

It is known in the art to make copolymers which are useful as suspending agents in liquid systems. Moreover, it is known in the art to make copolymers which are useful as peptizers in the precipitation of silver halide grains. The peptizers' function in the precipitation process is to prevent clumping of grains and to provide an evenly distributed dispersion of the metal salt crystals being formed in the process. Our recently filed copending application, U.S. Ser. No. 701,084 now U.S. Pat. No. 3,615,624 issued Oct. 26, 1971, discloses several monomers which are useful in preparing polymers which are useful as peptizers for silver salts. Many of the polymers disclosed in the above application and the prior art function well as peptizers, but coagulation and redispersion of the metal salt grains is difficult. In some instances, gelatin is necessary to carry out coagulation and redispersion steps. In other systems, redispersion after decanting could be achieved only by physical shredding, heating and/or active agitation of the coagulated material; often these systems result in a loss of a portion of the peptizer material upon redispersion. Therefore, it is desirable to find new peptizer or dispersion materials which both function as peptizers and can be easily coagulated and redispersed.

We have now found an improved class of polymers which are good peptizer and dispersing agents. Generally, polymers according to this invention are interpolymers comprising at least three different monomers.

In a preferred embodiment, the interpolymers of this invention can be used as very effective peptizers for silver halide suspensions including rapid and clean coagulation of the silver halide suspension. The coagulated material is coherent to allow easy removal of the liquid portion of the system without loss of coagulated material. Moreover, the coagulated material redisperses rapidly and completely. The coagulation is preferably achieved by raising or lowering the pH of the suspension to a point at which the polymer becomes insoluble in the medium. Redispersion of the polymer or coagulated material after washing, decanting and the like can be readily achieved by respectively lowering or raising the pH of the suspension.

In one preferred embodiment, the interpolymer of this invention comprises (1) from about 3 to about 30, and preferably from about 5 to about 20, mole percent of a peptizing unit, (2) about 30 to about 80, and preferably about 40 to about 65, mole percent of units of acrylic acid or methacrylic acid and (3) about 20 to about 70, and preferably 25 to about 50, mole percent of units of acrylic ester.

In another preferred embodiment, the interpolymers comprise (1) about 3 to about 30, and preferably 5 to about 20, mole percent of a peptizing unit, (2) about 20 to about 70, and preferably about 30 to about 50, mole percent of a weakly basic amine unit such as an acrylic amine, for example, 2-(dimethylamino)ethyl methacrylate, 2-(diethylamino)ethyl acrylate or 2-methyl-5-vinylpyridine, and (3) about 30 to about 80, and preferably about 40 to about 60, mole percent of units of an acrylic ester.

In still another preferred embodiment, the interpolymers of this invention are amphoteric interpolymers comprising (1) about 3 to about 30, and preferably about 5 to about 20, mole percent of peptizing units, (2) about 40 to about 90, and preferably about 60 to about 80, mole percent of weakly acid units and (3) about 5 to about 50, and preferably about 10 to about 30, mole percent of a weakly basic unit as referred to in the embodiment next above.

The peptizer units as referred to herein refer to those vinyl monomers which, when polymerized or interpolymerized, provide a peptizer effect in a silver halide precipitation. In a preferred embodiment, the peptizer unit is derived only from an amide or ester in which the respective amine or alcohol condensation residues comprise an organic radical having at least one sulfide-sulfur atom linking two alkyl carbon atoms. Typical polymers containing units of this type are disclosed in our parent application, U.S. Ser. No. 701,084 filed Jan. 29, 1968 now U.S. Pat. No. 3,615,624 issued Oct. 26, 1971, such as, for example, peptizer units of acrylamides or acrylates containing an appended straight or branched chain alkyl group, preferably appended to the ester or amide group, of from about two to about 12 carbon atoms containing at least one sulfide-sulfur atom linking the respective alkyl carbon atoms in said chain. Typical preferred peptizing moieties are units such as, for example, N-(3-thiabutyl) acrylamide
N-(3-thiapentyl)acrylamide
N-(4-methyl-2-thiapentyl)acrylamide
N-(2,5-dimethyl-4-thiahexyl)acrylamide
N-(5-thiaheptyl)acrylamide
N-(4-thiaheptyl)acrylamide
N-(6-methyl-4-thiaheptyl)acrylamide
N-(3-thiaoctyl)acrylamide
N-(7-thianonyl)acrylamide
N-(6-ethyl-2-methyl-4-thiaoctyl)acrylamide
N-(6-thia-2,4,9-trimethyldecyl)acrylamide
N-(4-thiadodecyl)acrylamide
Bis(2-thiabutyl)methyl acrylate
methylthioethyl acrylate
methacryloylpyrolylmethionine methyl ester In certain highly preferred embodiment of the invention, the peptizer units contain an amide linkage and one derived from an acrylamide.

The term "weakly basic units" as used herein refers to units of $\alpha,\beta$ ethylenically unsaturated monomers containing appended alkyl amino groups or aromatic amino groups and preferably refers to units of vinyl pyridines, amino acrylates and methacrylates and the like which are substantially free of acid groups such as carboxylic or sulfonic acid groups. Typical units which can be incorporated into the useful polymers of this invention include 2-methyl-5-vinylpyridine; 2-vinylpyridine; 4-vinylpyridine; 2-(N,N-dimethylamino)ethyl acrylate; 2-(N,N-diethylamino)ethyl acrylate; 2-(N,N-dimethylamino)ethyl methacrylate; 2-(N,N-diethylamino)ethyl methacrylate; and the like. In highly preferred embodiments, the weakly basic unit is a 2-methyl-5-vinylpyridine or an aminoalkylmethacrylate.

The term "weakly acid units" as used herein refers to units of $\alpha,\beta$ ethylenically unsaturated monomers containing carboxylic acid groups and the like and preferably refers to units of acrylic acid, methacrylic acid, itaconic acid and the like.

The acrylic esters referred to herein refer to the respective esters of acrylic and methacrylic compounds. Typical useful acrylic esters include methyl acrylate, ethyl acrylate, propyl acrylate, butyl acrylate, isopropyl acrylate, isobutyl acrylate, t-butyl acrylate, the respective methacrylates, and the like. Preferably, the alkyl acrylate is a simple compound such as methyl acrylate or methyl methacrylate.

The interpolymers of this invention can be generally polymerized by solution polymerization, emulsion polymerization or bulk polymerization procedures, but they are preferably polymerized by solution polymerization procedures. The polymerization is carried out to obtain a molecular weight of the interpolymer of at least about 10,000 to about 500,000 and preferably from about 30,000 to about 100,000. The inherent viscosities of the interpolymers generally range from about 0.1 to about 2.

The invention can be further illustrated by the following examples:

EXAMPLE 1: Copolymer of 3-thiapentyl acrylate, methyl methacrylate and acrylic acid (mole ratio 1:4.5:4.5)

A flask is charged with 80.00 g. of 3-thiapentyl acrylate, 225.0 g. of methyl methacrylate, 162.0 g. of acrylic acid, 2.34 g. of 2,2'-azobis(2-methylpropionitrile) and 1,870 ml. of ethanol. The system is swept with nitrogen for 15 minutes and then placed in a 60° C. bath overnight. The polymeric product is precipitated and thoroughly washed in 0.1 percent aqueous sulfuric acid. It is then rinsed with distilled water and dried under vacuum at room temperature. The brittle white polymer comprises 391.4 g.

Anal. for $C_{43}H_{66}O_{20}S$, Calcd: C, 55.2; H, 7.1; S, 3,4
Found: C, 54,8; H, 6.9; S, 3.2

The inherent viscosity of this polymer is 0.36 determined at 0.25 g./100 ml. solution at 25° C. in acetone.

A solution of 1.00 g. of this polymer in 60 ml. of water is prepared by adjusting the pH of the system to 6.4 with dilute aqueous sodium hydroxide. It is then treated with 6.56 g. of potassium bromide and 0.20 g. of potassium iodide. The system is stirred continuously at 70° C. as a solution of 7.64 g. of silver nitrate in 40 ml. of water is added at constant rate over 30 minutes. The resulting suspension remains smoothly dispersed upon cooling to room temperature.

A 50-g. sample of the above silver halide suspension is stirred continuously as it is treated with enough dilute sulfuric acid to lower its pH to 2.5. The particulate precipitate formed in the process quickly settles into a pad at the bottom of the vessel when the stirring is stopped. After several minutes the clear supernatant liquid is decanted and replaced with distilled water. The decanting process is very convenient and effective and occurs without loss of precipitate. Upon stirring, the precipitate breaks up into small discrete particles. Raising the pH back to 6.4 with dilute aqueous sodium hydroxide causes reformation of the smooth suspension within several minutes. The suspension does not settle out on standing.

EXAMPLE 1–A

Similar silver halide precipitations, coagulations and redispersions procedures are attempted as set forth in Example 1 with the use of poly[N-(3-thiapentyl)acrylamide-3-acryloyloxypropane-1-sulfonic acid, sodium salt] (1:9); copoly(ethyl acrylateacrylic acid-acryloylmethionine methyl ester) (5:2:1); poly[N-(3-thiabutyl)acrylamide-3-acryloyloxypropane-1-sulfonic acid, sodium salt]; copoly(acrylic acid-methylthioethyl acrylate) (3.33:1.0); copoly(acrylic acid-methacrylyl methionine) (3.33:1.0); and copoly[ethylene-N-(3-thiopropyl)meleamic acid]. While the silver halide could be formed in the desired grain distribution, coagulation and/or redispersion are quite difficult; in certain instances, the coagulated mixture has to be shredded to obtain redispersion and, even then, it redisperses slowly.

EXAMPLE 2: Copolymer of N-(3-thiabutyl)acrylamide, methyl methacrylate and methacrylic acid (mole ratio 1:4.5:4.5)

A flask is charged with 7.25 g. of N-(3-thiabutyl)-acrylamide, 22.50 g. of methyl methacrylate, 19.35 g. of methacrylic acid, 0.25 g. of 2,2'-azobis(2-methylpropionitrile) and 200 ml. of ethanol. After sweeping the system with nitrogen for 10 minutes, it is placed in a 60° C. bath overnight. The polymeric product is precipitated and thoroughly washed in water. It is dried under vacuum without heating, yielding 44.2 g. of a tough white polymer.

Anal. for $C_{93}H_{148}O_{38}N_2S_2$, Calcd: 56.8, H, 7.5; N, 1.4; S, 3.3
Found: C, 56.5; H, 7.4; N, 1.5; S, 2.9

The inherent viscosity of this polymer is 0.38 determined at 0.25 g./100 ml. solution at 25° C. in ethanol.

A solution of 2.0 g. of the above polymer in 120 ml. of water is prepared by adjusting the pH of the mixture to 6.4 with dilute sodium hydroxide. The solution is treated with 13.12 g. of potassium bromide and 0.4 g. of potassium iodide and placed in a 70° C. bath. It is stirred continuously as a solution of 15.28 g. of silver nitrate in 80 ml. of water is added at constant rate over 30 minutes. The resulting suspension remains smoothly dispersed upon cooling to room temperature.

A 50-g. sample of the above silver halide suspension is stirred continuously as it is treated with enough dilute sulfuric acid to lower its pH to 4.0. The particulate precipitate formed in the process settles into a pad at the bottom of the vessel when the stirring is stopped. After about an hour, the clear supernatant liquid is decanted without loss of precipitate and replaced with distilled water. Upon stirring, the precipitate breaks up into small discrete particles. Raising the pH back to 6.4 with dilute aqueous sodium hydroxide causes reformation of the smooth suspension within several minutes. The suspension does not settle out on standing.

EXAMPLE 3: Copolymer of 3-thiapentyl acrylate, methyl methacrylate and acrylic acid (mole ratio 1:3:6)

A flask is charged with 96.0 g. of 3-thiapentyl acrylate, 180.0 g. of methyl methacrylate, 259.2 g. of acrylic acid, 2.68 g. of 2,2'-azobis(2-methylpropionitrile) and 2140 ml. of ethanol. The system is swept with nitrogen for 15 minutes and placed in a 60° C. bath overnight. The polymeric product is precipitated and thoroughly washed in 0.1 percent aqueous sulfuric acid. It is then rinsed with distilled water and dried under evacuation without heating. The tough white polymer comprises 258.8 g.

Anal. for $C_{40}H_{60}O_{20}S$, Calcd: C, 53.8; H, 6.8; S, 3.6
Found: C, 55.2, H, 7.3; S, 3.2

The inherent viscosity of this polymer is 0.33 determined at 0.25 g./100 ml. at 25° C. in acetone.

A silver halide suspension is prepared in the presence of this polymer in the same manner as that prepared in Example 2. The suspension remains smoothly dispersed at room temperature.

A 50-g. sample of the silver halide suspension is tested in the same manner as that in Example 1 with identical results.

EXAMPLE 4: Copolymer of N-(3-thiabutyl)acrylamide, methyl methacrylate and acrylic acid (mole ratio 1:4:5)

A flask is charged with 72.5 g. of N-(3-thiabutyl)-acrylamide, 200.0 g. of methyl methacrylate, 180.0 g. of acrylic acid, 2.26 g. of 2,2'-azobis(2-methylpropionitrile) and 1,810 ml. of ethanol. The system is purged with nitrogen for 15 minutes and placed in a 60° C. bath overnight. The polymeric product is precipitated and thoroughly washed in 0.1 percent sulfuric acid followed by a distilled-water rinse. Upon drying the product under vacuum at room temperature, a 366.7 g. yield of a brittle, white polymer is obtained.

Anal. for $C_{41}H_{53}O_{19}NS$, Calcd: C, 55.0; H, 6.0; N, 1.6; S, 3.6
Found: C, 54.6; H, 6.3; N, 1.7; S, 3.2

The inherent viscosity of this polymer is 0.32 determined at 0.25 mg./100 ml. at 25° C. in ethanol.

A 2.0-g. sample of this polymer dissolved in 120 ml. of water at pH 6.4 is treated with 13.12 g. of potassium bromide and 0.40 g. of potassium iodide. The system is stirred continuously at 70° C. as a solution of 15.28 g. of silver nitrate in 80 ml. of water is added at a constant rate over a 30-minute period. The silver halide suspension thus formed is cooled to room temperature where it remains smoothly dispersed.

A 50-g. sample of the suspension is treated with enough dilute sulfuric acid to lower its pH to 4.0. An immediate clean precipitation occurs with the formation of a compact pad of precipitate on the bottom of the vessel. After allowing the system to stand a few minutes, the clear supernatant liquid is conveniently and completely decanted from the precipitate which clings to the vessel. There is no observable loss of precipitate in the process. The decantate is replaced with distilled water and the pH of the system is raised back to 6.4 with stirring. Within a few minutes the precipitate is completely redispersed, forming a smooth dispersion again.

EXAMPLE 5: Copolymer of 3-thiapentyl acrylate, methyl methacrylate and 2-(dimethylamino)ethyl methacrylate (mole ratio 1:5:4)

A flask is charged with 8.00 g. of 3-thiapentyl acrylate, 25.00 g. of methyl methacrylate, 31.40 g. of 2-(dimethylamino)ethyl methacrylate, 0.32 g. of 2,2'-azobis(2-methylpropionitrile) and 260 ml. of acetone. It is swept for 10 minutes with nitrogen and placed in a 60° C. bath overnight under a reflux condenser. The polymeric product is precipitated and washed in water, following which it is dried under evacuation without heating. A yield of 53.8 g. of a tough white polymer is obtained.

Anal. for $C_{64}H_{112}O_{20}N_4S$, Calcd: C, 59,6; H, 8.8; N, 4.3; S, 2.4
Found: C, 59.9; H, 8.8; N, 4.5; S, 2.2

The inherent viscosity of this polymer is 0.38 determined at 0.25 g./100 ml. solution at 25° C. in acetone.

A 5.0-g. sample of this polymer dissolved in 300 ml. of water at pH 5.3 is treated with 32.8 g. of potassium bromide and 1.0 g. of potassium iodide. The system is stirred continuously at 70° C. as a solution of 38.2 g. of silver nitrate in 190 ml. of water is added at a constant rate over a 30-minute period. The silver halide suspension thus formed is cooled to room temperature where it remains smoothly dispersed.

A 50-g. sample of the suspension is stirred continuously as it is treated with enough dilute sodium hydroxide to raise its pH to 7.8. The stirring is continued for 5 minutes after the pH change and is then stopped. The particulate precipitate formed in the process then settles into a pad at the bottom of the vessel. After several minutes, the clear supernatant liquid is conveniently decanted without loss of precipitate and is replaced with distilled water. Upon stirring, the precipitate immediately breaks up into small discrete particles. Lowering the pH to about 3 with dilute sulfuric acid causes reformation of the smooth suspension within several minutes.

EXAMPLE 6: Copolymer of 3-thiapentyl methacrylate, methyl methacrylate and 2-(dimethylamino)ethyl methacrylate (mole ratio 1:5:4)

A flask is charged with 8.70 g. of 3-thiapentyl methacrylate, 25.00 g. of methyl methacrylate, 31.40 g. of 2-(dimethylamino)ethyl methacrylate, 0.32 g. of 2,2'-azobis(2-methylpropionitrile) and 260 ml. of acetone. The system is swept with nitrogen for 10 minutes and placed in a 60° C. bath overnight. Upon cooling the resulting polymer dope to room temperature, the polymeric product is precipitated and thoroughly washed in water. This moist polymer is treated with 250 ml. of water and enough sulfuric acid to dissolve it. The clear dope which results is at pH 5.3 and contains 17.2 percent solids.

A 29.1-g. sample of the above polymer dope (containing 5.0 g. of solids) is treated with 32.8 g. of potassium bromide, 1.0 g. of potassium iodide and 275 ml. of distilled water. The pH of the system is adjusted to 2.0 and it is stirred continuously at 70° C. as a solution of 38.2 g. of silver nitrate in 190 ml. of water is added at constant rate over 30 minutes. The silver halide suspension thus formed is then cooled to room temperature.

A 50-g. sample of the above suspension is stirred continuously as it is treated with enough dilute sodium hydroxide to raise its pH to 7.8. The stirring is continued for 5 minutes after the pH change and is then stopped. The particulate precipitate formed in the process then settles into a pad at the bottom of the vessel. After about an hour, the clear supernatant liquid is conveniently decanted without loss of precipitate and replaced with distilled water. Upon stirring, the precipitate immediately breaks up into small discrete particles. Lowering the pH to about 3 with dilute sulfuric acid causes reformation of the smooth suspension within several minutes.

EXAMPLE 7: Copolymer of 3-thiapentyl acrylate, methacrylic acid and 2-(dimethylamino)ethyl methacrylate (mole ratio 1:7:2)

A flask is charged with 6.00 g. of 3-thiapentyl acrylate, 22.59 g. of methacrylic acid, 11.79 g. of 2-(dimethylamino)ethyl methacrylate, 0.81 g. of 2,2'-azobis(2-methylpropionitrile) and 162 ml. of dimethylformamide. The system is swept with nitrogen for 10 minutes and stirred at 90° C. for 2 hours. Upon cooling the resulting polymer dope to room temperature, the polymeric product is precipitated and thoroughly washed in acetone. It is dried under evacuation without heating, yielding 31.6 g. of a brittle white polymer.

Anal. for $C_{51}H_{84}O_{20}N_2S$, Calcd: C, 56.9; H, 7.9; N, 2.6; S, 3.0

Found: C, 56.5; H, 7.5; N, 3.0; S, 2.6

The inherent viscosity of this polymer is 0.13 determined at 0.25 g./100 ml. at 25° C. in dimethylformamide.

A beaker is charged with 200 g. of a 5 percent aqueous solution of the above polymer, 65.6 g. of potassium bromide, 2.0 g. of potassium iodide and 600 ml. of water. The pH of the system is adjusted to 6.4 and it is stirred continuously at 70° C. as a solution of 76.4 g. of silver nitrate in 400 ml. of water is added at constant rate over 30 minutes. The silver halide suspension thus formed is then cooled to room temperature.

A 50-g. sample of the above suspension is treated with enough dilute sulfuric acid to lower the pH to 4.7. At this point a rapid, clean precipitation occurs. Discrete particles are then formed which settle rapidly, forming a pad the bottom of the vessel. After allowing the system to stand about 30 minutes, the clear supernatant liquid is decanted conveniently without loss of precipitate. The decantate is then replaced with distilled water. Upon stirring, the precipitate quickly breaks up into small, discrete particles. The pH of the system is then raised back to 6.4 where it quickly reforms a smooth suspension. The precipitation, decanting and redispersion processes are repeated with the same results.

EXAMPLE 8: Copolymer of 3-thiapentyl methacrylate, methacrylic acid and 2-(diethylamino)ethyl methacrylate (mole ratio 11:7:2)

A flask is charged with 26.1 g. of 3-thiapentyl methacrylate, 90.3 g. of methacrylic acid, 55.5 g. of 2-(diethylamino)ethyl methacrylate, 0.86 g. of 2,2'-azobis(2-methylpropionitrile) and 688 ml. of dimethyl sulfoxide. After sweeping the system with nitrogen for 10 minutes, it is placed in a 60° C. bath with continuous stirring for 4 hours. The polymeric product is precipitated and thoroughly washed in acetone and then dried under evacuation at room temperature. A 168.3-g. yield of a brittle polymer is obtained.

Anal. for $C_{52}H_{86}O_{20}N_2S$, Calcd: C, 57.2; H, 8.0; N, 2.6; S, 2.9

Found: C, 57.3; H, 8.0; N, 2.7; S, 2.6

The inherent viscosity of this polymer is 0.70 determined at 0.25 g./100 of solution at 25° C. in dimethyl sulfoxide.

A silver halide suspension is prepared in the presence of this polymer in the same manner as that prepared in Example 2. The suspension remains smoothly dispersed at room temperature.

A 50-g. sample of the silver halide suspension is tested in the same manner as that in Example 2 with identical results.

EXAMPLE 9: Copolymer of 3-thiapentyl acrylate, methacrylic acid and 2-methyl-5-vinylpyridine (mole ratio 1:7:2)

A flask is charged with 32.00 g. of 3-thiapentyl acrylate, 120.40 g. of methacrylic acid, 47.60 g. of 2-methyl-5-vinylpyridine, 1.00 g. of 2,2'-azobis(2-methylpropionitrile) and 800 ml. of dimethyl sulfoxide. The system is swept with nitrogen for 15 minutes and placed in a 60° C. bath overnight. The polymeric product is precipitated and thoroughly washed in acetone. It is then dried under evacuation without heating, yielding 191.3 g. of a brittle white polymer.

Anal. for $C_{51}H_{72}O_{16}N_2S$, Calcd: C, 61.2; H, 7.3; N, 2.8; S, 3.2

Found: C, 56.7; H, 7.3; N, 3.0; S, 6.7

The inherent viscosity of this polymer is 0.60 determined at 0.25 g./100 ml. of solution at 25° C. in dimethyl sulfoxide.

A silver halide suspension is prepared in the presence of this polymer in the same manner as that prepared in Example 2.

A 50-g. sample of the silver halide suspension is tested in the same manner as that in Example 2 with identical results.

EXAMPLE 10: Copolymer of 3-thiapentyl acrylate, methacrylic acid and 2-(diethylamino)ethyl methacrylate (mole ratio 1:7:2)

A flask is charged with 8.00 g. of 3-thiapentyl acrylate, 30.10 g. of methacrylic acid, 18.50 g. of 2-(diethylamino)-ethyl methacrylate, 0.28 g. of 2,2'-azobis(2-methylpropionitrile) and 225 ml. of dimethyl sulfoxide. The system is swept with nitrogen for 10 minutes and placed in a 60° C. bath overnight. The polymeric product is precipitated and thoroughly washed in acetone. It is then dried under evacuation without heating, yielding 52.4 g. of a brittle white polymer.

Anal. for $C_{55}H_{92}O_{20}N_2S$, Calcd: C, 58.3; H, 8.2; N, 2.5; S, 2.8

Found: C, 56.0; H, 8.2; N, 3.4; S, 4.5

The inherent viscosity of this polymer is 0.58 determined at 0.25 g./100 ml. of solution at 25° C. in dimethyl sulfoxide.

A silver halide suspension is prepared in the presence of this polymer in the same manner as that prepared in Example 2. The suspension remains smoothly dispersed at room temperature.

A 50-g. sample of the silver halide suspension is tested in the same manner as that in Example 1 except that the pH is lowered to 4.1 in this case. The results are identical.

Although the invention has been described in considerable detail with particular reference to certain preferred embodiments thereof, variations and modifications can be effected within the spirit and scope of the invention.

We claim:

1. An interpolymer comprising at least three different monomers comprising (1) about 3 to about 30 mole percent of peptizing units selected from the group consisting of acrylamides and acrylates, wherein said acrylamides and acrylates contain an appended alkyl chain containing one or two sulfide sulfur atoms linking respective carbon atoms in said alkyl chain, (2) about 40 to about 90 mole percent of a weakly acid unit selected from the group consisting of $\alpha,\beta$ ethylenically unsaturated monomers containing carboxylic acid groups or about 20 to about 70 mole percent of a weakly basic unit selected from the group consisting of $\alpha,\beta$ ethylenically unsaturated monomers containing appended alkyl amino groups or aromatic amino groups and (3) about 20 to about 80 mole percent of an acrylic ester or 5 to about 50 mole percent of a weakly basic unit as defined above where said weakly acid units are present under (2).

2. A polymer according to claim 1 wherein said weakly acid units are units of acrylic acid or methacrylic acid.

3. A polymer according to claim 1 wherein said weakly basic units are units of vinyl pyridines, amino alkylene acrylates and amino alkylene methacrylates.

4. An interpolymer according to claim 1 comprising (1) from about 5 to about 20 mole percent of a peptizing unit, (2) about 40 to about 65 mole percent of units of the weakly acid units of acrylic acid or methacrylic acid and (3) about 25 to 50 mole percent of units of an acrylic ester.

5. An interpolymer according to claim 1 comprising (1) about 5 to about 20 mole percent of a peptizing unit, (2) about 30 to about 50 mole percent of an acrylic amine and (3) about 40 to about 60 mole percent of an acrylic ester.

6. An interpolymer according to claim 1 comprising (1) about 5 to about 20 mole percent of a peptizing unit, (2) about 60 to about 80 mole percent of weakly acid units and (3) about 10 to about 30 mole percent of weakly basic units.

7. An interpolymer according to claim 1 which is copoly(3-thiapentyl acrylate-acrylic acid-methyl methacrylate).

8. An interpolymer according to claim 1 which is copoly[N-(3-thiabutyl)acrylamide-methacrylic acid-methyl methacrylate].

9. An interpolymer according to claim 1 which is copoly(3-thiapentyl acrylate-methacrylic acid-methyl methacrylate).

10. An interpolymer according to claim 1 which is copoly[N-(3-thiabutyl)acrylamide-acrylic acid-methyl methacrylate].

11. An interpolymer according to claim 1 which is copoly[3-thiapentyl methacrylate-2-(dimethylamino)ethyl methacrylate-methyl methacrylate].

12. An interpolymer according to claim 1 which is copoly[3-thiapentyl acrylate-2-(dimethylamino)ethyl methacrylate-methacrylic acid].

13. An interpolymer according to claim 1 which is copoly(3-thiapentyl acrylate-methacrylic acid-2-methyl-5-vinyl pyridine).

14. Copoly[3-thiapentyl acrylate-2-(dimethylamino)ethyl methacrylate-methyl methacrylate].

* * * * *